United States Patent [19]

Kropscoti

[11] 3,888,806

[45] June 10, 1975

[54] POLYURETHANE COMPOSITE STRUCTURES

[75] Inventor: Earle L. Kropscoti, Lake Jackson, Tex.

[73] Assignee: The Dow Chemical Company, Midland, Mich.

[22] Filed: Nov. 16, 1972

[21] Appl. No.: 307,150

[52] U.S. Cl. ........ 260/33.8 UB; 260/31.8; 260/77.5; 264DIG. 7; 264/128; 428/425; 264/45; 264/122
[51] Int. Cl. ..................................... C03c 25/00
[58] Field of Search ........... 161/190, 158, 151, 170, 161/175, 87, 93, 162, 168, DIG. 4; 156/62.2, 242; 264/122, 128, DIG. 7, 45; 260/31.8, 77.5; 117/16, 21, 126 GB

[56] References Cited
UNITED STATES PATENTS

| | | | |
|---|---|---|---|
| 2,951,001 | 8/1960 | Rubenstein | 161/158 |
| 3,050,427 | 8/1962 | Slayter et al. | 264/128 |
| 3,121,656 | 2/1964 | Gluck | 161/158 |
| 3,287,474 | 11/1966 | Harrington | 264/122 |
| 3,378,511 | 4/1968 | Newton | 260/31.8 N |
| 3,464,935 | 9/1969 | Sepkoshi et al. | 161/190 |

*Primary Examiner*—George F. Lesmes
*Assistant Examiner*—James J. Bell
*Attorney, Agent, or Firm*—James G. Carter

[57] ABSTRACT

Polyurethane composite structures are prepared from fibrous matt having granular scrap material dispensed thereon which has then been rolled or made to conform to a desired configuration wherein said fibrous matt is placed in a mold and a composition which rapidly sets into a polyurethane is dispensed into the mold. These composite structures are an excellent manner of disposing of scrap plastic materials.

3 Claims, No Drawings

POLYURETHANE COMPOSITE STRUCTURES

This invention relates to polyurethane composite structures and method for their preparation.

Presently, attempts and concerted efforts are being made to provide means for the elimination of or the reduction of atmospheric pollutants. One source of pollutants is in the incineration of scrap, plastic materials.

One method for disposing of scrap plastic material is to granulate the scrap material and disperse them in a thermosettable composition and effecting the cure of such a composition. While this method may provide a means for obtaining a useful product from such a scrap plastic material, it too has its disadvantages. One such disadvantage is that because of varying densities between the plastic scrap and the thermosettable composition, the granular scrap material tends to migrate toward the top or bottom of the mold or container prior to curing of the thermoplastic material.

It has now been discovered that this migration deficiency can be reduced or eliminated by employing a fibrous matt reinforcing material on which has been placed the desired granular scrap material.

The matt containing the scrap material is rolled or formed into a desired shape and placed in a suitable mold followed by the filling of the mold with a suitable thermosettable material. The non-woven fibrous matt serves to hold the granular scrap materials in place thereby preventing them from migrating to the bottom or top of the mold.

The matt containing the scrap material is then rolled or formed into a desired shape or configuration and placed into a suitable mold followed by the filling of the mold with a thermosetting composition which rapidly solidifies forming a polyurethane and which can be removed from a mold ready for use within about 5 minutes as measured from the time of mixing the components employed in preparing the rapid setting polyurethane. The fibrous matt serves to hold the granular scrap materials in place thereby preventing them from migrating to the bottom or top of the mold.

The matt can be made from a variety of fibrous materials such as glass, polyester, saran, polypropylene, and the like. Fibrous materials which absorb moisture (>1% by weight) cause foaming of the urethane. This can be avoided by drying the materials before use. Although woven matt materials can be employed, non-woven matt is preferred because of economics.

The term *granular scrap material* as used herein includes regular or irregular-shaped granules or aggregate particles of such scrap materials having a particle size of from about 1/32 inch to about one-half inch average diameters and preferably from about one-eighth inch to about one-fourth inch.

Any plastic scrap materials can be utilized such as, for example, epoxy resins, polyurethanes, polyesters, polycarbonates, polyolefins, polystyrene polyvinyl chloride, saran, acrylonitrile-butadiene-styrene copolymers, phenolic resins, melamines, mixtures thereof and the like. Plastic scrap materials with high moisture (>1% by wt.) cause foaming of the urethane. This can be avoided by drying before use.

The term *rapid-setting* as used herein means that the composition will rapidly solidify without the application of external sources of heat and can be removed from a mold within 5 minutes and preferably within 3 minutes from the time the reactants are mixed together. Upon removal from the mold, the products have sufficient strength to be handled and normally have sufficient strength to be employed for their intended purpose. However, the physical properties, if desired, in many instances can be improved by post curing at elevated temperatures.

Suitable rapid setting polyurethane compositions which may be employed are those compositions comprising A. a polyol selected from the group consisting of polyether polyols having from about 3 to about 8 hydroxyl groups and a hydroxyl equivalent weight of from about 75 to about 230, and dihydroxyl-containing compounds having an OH equivalent weight of less than about 250;

B. an organic polyisocyanate with the proviso that when component (A) is a dihydroxyl-containing compound, the polyisocyanate has an NCO functionality of at least 2.5;

C. a liquid modifier compound having a boiling point above about 150°C with the proviso that when the liquid modifier compound is a halogenated aliphatic compound containing substituent hydroxyl groups then the boiling point may be less than 150°C; and D. a non-amine-containing catalyst for urethane formation;

wherein components (A) and (B) are present in quantities so as to provide an NCO:OH ratio of from about 0.8:1 to about 2:1, component (C) is present in quantities of from about 20 to about 50 percent by weight of the sum of components (A), (B) and (C); and component (D) is present in quantities of from about 0.2 to about 10 percent by weight of the sum of the weight of components (A), (B) and (C); with the provisio that when component (C) is a halogenated aliphatic compound, it is employed in a range of from about 0.2 to about 50 percent by weight of the sum of the weights of A, B and C, that when the halogenated aliphatic compound also contains hydroxyl groups and has an OH equivalent weight of less than about 500 it is employed in quantities of from about 0.2 to about 5 percent by weight based upon the sum of the weights of (A), (B) and (C), and that when component (C) is a non-ester-containing aromatic compound or a halogenated aliphatic compound, the non-amine containing catalysts, component (D), is employed in quantities of from about 0.01 to about 10 percent by weight of the combined weights of components (A), (B) and (C), and when component (A) is an amine initiated polyol, component (D) may be omitted.

Suitable liquid modifier compounds include hydroxyl-containing polyoxyalkylene compounds having a molecular weight above about 700, ester-modified polyoxyalkylene compounds having a molecular weight above about 700, non-hydroxyl-containing polyoxyalkylene compounds, fatty oils, fatty acids, organic phosphates, organic phosphites, organic phosphonates, cyclic ethers, non-ester-containing aromatic compounds, hydrogenated aromatic compounds, halogenated aliphatic compounds, esters of carboxylic acids, cyclic sulfones, organic carbonates, and mixtures thereof.

These liquid modifier compounds as well as suitable molds for use in casting the compositions employed in the present invention, suitable catalysts, polyols and polyisocyanates are more fully described in U.S. Pat. No. 3,378,511, the following copending applications, and each of such patent and applications are incorporated herein by reference.

"NON-ELASTOMERIC POLYURETHANES" by Franciszek Olstowski and Donald B. Parrish, Ser. No. 179,149 filed Sept. 9, 1971 and now abandoned;

"RIGID POLYURETHANE COMPOSITIONS" by Fraciszek Olstowski and Donald B. Parrish, Ser. No. 191,343 filed Oct. 21, 1971 now U.S. Pat. No. 3,746,692;

"RAPID-SETTING POLYURETHANE COMPOSITIONS", by Elvis E. Jones, Franciszek Olstowski and Donald B. Parrish, Ser. No. 195,498 filed Nov. 3, 1971 now U.S. Pat. No. 3,726,827;

"RAPID SETTING POLYURETHANES FROM DIOLS AND POLYFUNCTIONAL ISOCYANATES", by Franciszek Olstowski, Ser. No. 205,658 filed Dec. 7, 1971 and now abandoned; and "SOLID, RAPID SETTING, RIGID POLYURETHANES" by Franciszek Olstowski, Ser. No. 221,784 filed Jan. 28, 1972 and now abandoned.

The polyurethane composite structures of the present invention are useful as rods, cylinders and rectangular stock parts. They can also be machined into rollers, brackets, wedges, spindles, furniture parts such as arm rests, tables and chair legs, doors, drawers, decorative molding and base-boards, handles, knobs and drapery pulls, posts, cross arms for electric and telephone poles, rail-road ties, stakes, pallets, crates, boxes and the like.

The following examples are illustrative of the present invention, but are not to be construed as to limiting the scope thereof in any manner.

EXAMPLE 1

A 12 inches × 18 inches × 0.004 inches sheet of nonwoven Fiberglas mat (approximately 10 g/sq. ft.) was placed on a flat surface and polystyrene granules of approximately one-eighth inch × one-eigth inch cylinders were spread on the matt in a quantity providing about 300 grams of granules/sq. ft. of matt. The matt and granules were then rolled into a cylinder and placed in a cylindrical shaped mold. The void space remaining in the mold was filled with a formulation consisting of 1. 283 grams of a prepolymer prepared from the reaction product of
   a. a polyol prepared by reacting glycerine with propylene oxide having an OH equivalent weight of about 85, with
   b. an 80/20 mixture of 2,4–/2,6-toluenediisocyanate, said prepolymer containing about 32% unreacted NCO groups;
2. 170 grams of the reaction product of glycerine with propylene oxide to an OH equivalent weight of about 85;
3. 227 grams of dioctyl phthalate;
4. 1 gram of stannous octoate.

Components 1, 2 and 3 were well mixed, and then component (4) was added, mixed and the mixture poured into the mold. The mixture rapidly solidified within a period of about 30 seconds after catalyst (component 4) addition and the composite structure was removed from the mold within 5 minutes after catalyst addition.

The composite contained about 45% of the polyurethane and about 55% by weight of the fibrous matt containing the polystyrene granules.

Test bars approximately ½ inch × 5 inches × 5 inches were cut from the molding and were found to possess the following properties.

| | |
|---|---|
| Heat distortion temperature | 179°F |
| Compressive Strength | 7,300 psi |
| (measured in a direction parallel to the length of the cylinder as cast). | |

EXAMPLE 2

The procedure of Example 1 was repeated using granules of a casting prepared from a polyurethane prepared from components (1), (2), (3) and (4) instead of the polystyrene granules. The properties of the resultant composite structure were:

| | |
|---|---|
| Heat distortion temperature | 108°F |
| Compressive strength | 9,900 psi |
| (measured in a direction parallel to the length of the cylinder as cast). | |

I claim:
1. A polyurethane composite comprising
   1. a fibrous matt material conformed to a desired configuration which prior to said conformation has disposed thereon granular plastic scrap material and
   2. a rapid-setting polyurethane composition disposed about and throughout component (1);

wherein the rapid-setting polyurethane is a composition comprising:

A. a polyol selected from the group consisting of polyether polyols having from about 3 to about 8 hydroxyl groups and a hydroxyl equivalent weight of from about 75 to about 230, and dihydroxyl-containing compounds having an OH equivalent weight of less than about 250;

B. an organic polyisocyanate with the proviso that when component (A) is a dihydroxyl-containing compound, the polyisocyanate has an NCO functionality of at least 2.5;

C. a liquid modifier compound having a boiling point above about 150°C with the proviso that when the liquid modifier compound is a halogenated aliphatic compound containing substituent hydroxyl groups then the boiling point may be less than 150°C;

D. a non-amine-containing catalyst for urethane formation;

wherein components (A) and (B) are present in quantities so as to provide an NCO:OH ratio of from about 0.8:1 to about 2:1, component (C) is present in quantities of from about 20 to about 50 percent by weight of the sum of components (A), (B) and (C); and component (D) is present in quantities of from about 0.2 to about 10 percent by weight of the sum of the weight of components (A), (B) and (C); with the proviso that when component (C) is a halogenated aliphatic compound, it is employed in a range of from about 0.2 to about 50 percent by weight of the sum of the weights of A, B and C, that when the halogenated aliphatic compound also contains hydroxyl groups and has an OH equivalent weight of less than about 500 it is employed in quantities of from about 0.2 to about 5 percent by weight based upon the sum of the weights of (A), (B) and (C), and that when component (C) is a non-ester-containing aromatic compound or a halogenated aliphatic compound, the non-amine containing catalysts, component (D), is employed in quantities of from about 0.01 to about 10 percent by weight of the combined weights of components (A), (B) and (C), and when component (A) is an amine initiated polyol, component (D) may be omitted.

2. The composite of claim 1 wherein component (1) is a non-woven fiber glass matt.

3. The composite of claim 1 wherein the granular scrap material is a polyurethane material.

* * * * *